UNITED STATES PATENT OFFICE.

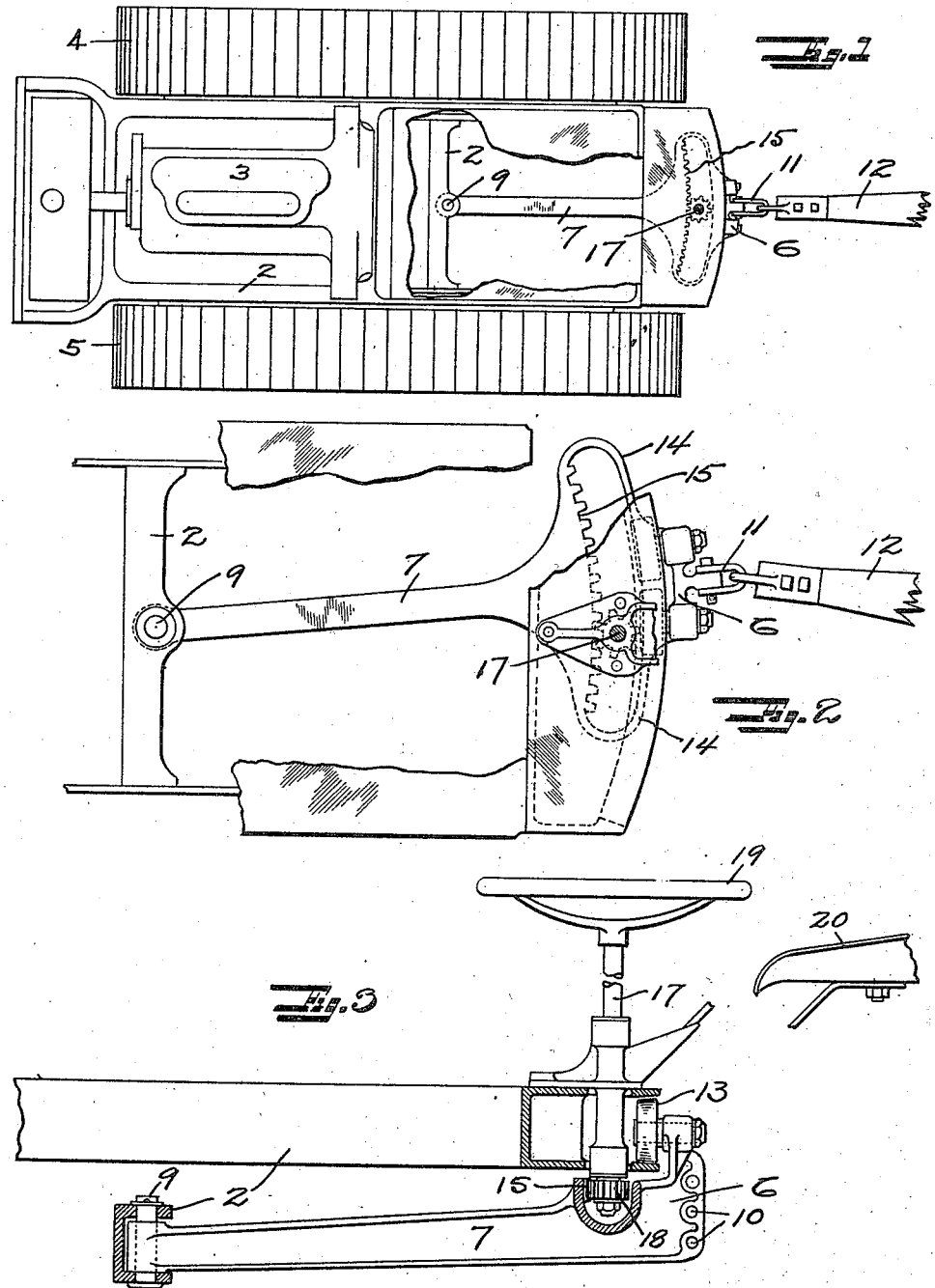

FRED V. JOHNSON, OF MARYSVILLE, CALIFORNIA, ASSIGNOR TO THE YUBA CONSTRUCTION COMPANY, A CORPORATION OF CALIFORNIA.

STEERING MECHANISM.

1,187,627.  Specification of Letters Patent.  Patented June 20, 1916.

Application filed April 13, 1915. Serial No. 21,030.

*To all whom it may concern:*

Be it known that I, FRED V. JOHNSON, a citizen of the United States, and a resident of Marysville, Yuba county, State of California, have invented certain new and useful Steering Mechanism, of which the following is a specification.

The invention relates to steering mechanism for tractors and especially for tractors of the track laying type.

An object of the invention is to provide a simple and efficient steering mechanism for tractors.

A further object of the invention is to provide a steering mechanism by means of which the apparatus or device being drawn by the tractor may be moved in a straight line.

The invention possesses other advantageous features, some of which, with the foregoing, will be set forth at length in the following description where I shall outline in full that form of the invention which I have selected for illustration in the drawings accompanying and forming part of the present specification. In the drawings I have shown only one specific form of my generic invention, but it is to be understood that I do not limit myself to such form, because my invention may be embodied in a multiplicity of forms, each being a species of my said invention. It is also to be understood that by the claims succeeding the description of my invention, I desire to cover the invention in whatever form it may be embodied.

Referring to said drawings: Figure 1 is a plan or top view of a tractor embodying my invention, part of the tractor being broken away to show the steering mechanism. Fig. 2 is an enlarged plan view of the steering mechanism. Fig. 3 is a vertical section of the steering mechanism.

The tractor to which the steering mechanism of my invention is applied is of the track-laying type and comprises the frame or body 2 upon which the engine 3 is mounted. The frame is mounted on and moves over the endless driven treads 4—5 arranged at opposite sides of the tractor and the tractor is supported entirely on the two treads. The tractor is provided at its rear end with means for connecting a load to be drawn to the tractor and the load connecting member is movable laterally to shift the point of connection of the load with relation to the longitudinal center line of the tractor. In the present instance the load connecting member 6 is formed integral with or comprises a draw-bar 7 which is pivoted to the tractor frame 2, along the longitudinal center line of the tractor, by the vertical pivot 9. The connecting member 6 is provided with a plurality of apertures 10 adapted to receive a clevis 11 or other connector, by which the load such as a plow having a tree 12 may be attached to the connecting member 6. The draw bar 7 is supported at its rear end by a roller 13 which runs on the frame of the tractor.

Means are provided for moving the point of connection between the tractor and the load laterally so that the direction of pull of the tractor with relation to the load may be varied. This is accomplished in the present instance by swinging the draw-bar laterally. The draw-bar is provided adjacent its rear end with laterally extending portions 14 in which are formed the rack 15 which is concentric with the pivot 9. Mounted on the frame of the tractor along its longitudinal center line is a steering shaft 17 which is provided on its lower end with a pinion 18 meshing with the rack. Mounted on the upper end of the steering shaft is a steering wheel 19 which is properly positioned with respect to the operator's seat 20.

As the steering wheel is operated, the point of connection between the tractor and the load is moved laterally from the center line of the tractor, thereby shifting the line of drag to one side of the center of the tractor and consequently causing the tractor to turn toward that side to which the point of connection is moved. This steering mechanism is particularly useful when the tractor is used for plowing owing to the fact that when in plowing a straight furrow, the tractor moves away from the furrow toward the plowed ground and the plow may be swung back again by moving the point of connection toward the unplowed ground. This immediately places the plow where it belongs and the tractor comes back into its proper course on account of the off-set load. Thus two points are accomplished at the same time, the plow is kept in a straight furrow and the tractor is guided back to its proper course. When the tractor is again in the proper position the point of connection is allowed to swing back to the center of the tractor.

I claim:

In a tractor, a body, endless treads at opposite sides of the body, a draw bar having a rack and pivoted to said body, and steering means at the rear of said body including a hand wheel and a pinion engaging said rack whereby said draw bar may be swung laterally about its pivot to shift the pull on said treads.

In testimony whereof, I have hereunto set my hand at Marysville, Yuba county, California, this 25th day of March, 1915.

FRED V. JOHNSON.

In presence of—
JULIA M. SHAFFER,
EMMA A. COUGHLIN.